(12) United States Patent
Pamperin

(10) Patent No.: US 7,601,918 B2
(45) Date of Patent: Oct. 13, 2009

(54) PROTECTIVE BARRIER FOR PIPING AND CABLING

(75) Inventor: John M. Pamperin, Louisville, KY (US)

(73) Assignee: Pro Block, LLC, KY (US)

( * ) Notice: Subject to any disclaimer, the term of this patent is extended or adjusted under 35 U.S.C. 154(b) by 0 days.

(21) Appl. No.: 11/678,817

(22) Filed: Feb. 26, 2007

(65) Prior Publication Data

US 2007/0169820 A1 Jul. 26, 2007

Related U.S. Application Data

(60) Provisional application No. 60/767,092, filed on Mar. 2, 2006, provisional application No. 60/805,800, filed on Jun. 26, 2006, provisional application No. 60/823,930, filed on Aug. 30, 2006.

(51) Int. Cl.
*H01B 7/00* (2006.01)

(52) U.S. Cl. ............... 174/135; 174/650; 174/662; 174/664; 174/665; 248/56; 439/583; 439/581; 16/2.1

(58) Field of Classification Search ......... 174/650–660, 174/662, 664, 665, 59, 135; 439/583, 584, 439/462, 581, 604, 587; 248/56; 277/606; 16/2.1, 2.2
See application file for complete search history.

(56) References Cited

U.S. PATENT DOCUMENTS

| | | | |
|---|---|---|---|
| 1,803,894 A | | 5/1931 | Cross |
| 2,365,785 A | * | 12/1944 | Tinnerman .............. 248/56 |
| 2,541,406 A | * | 2/1951 | Clapp .................. 174/45 R |
| 2,870,242 A | | 1/1959 | Wilkerson |
| 3,855,413 A | | 12/1974 | Baillie |
| 3,918,667 A | | 11/1975 | Madden |
| 4,924,646 A | | 5/1990 | Marquardt |
| 5,079,389 A | | 1/1992 | Nelson |
| 5,421,541 A | | 6/1995 | Condon |
| 6,241,199 B1 | | 6/2001 | Ismert |
| 6,642,445 B1 | * | 11/2003 | Lalancette ............. 174/507 |
| 6,779,232 B2 | | 8/2004 | Cerul |
| 6,901,628 B2 | * | 6/2005 | Cerul .................... 16/2.1 |
| 2006/0004366 A1 | | 1/2006 | Cerul |

* cited by examiner

*Primary Examiner*—Dhiru R Patel
(74) *Attorney, Agent, or Firm*—Chad Bruggeman; John Salazar; Middleton Reutlinger

(57) ABSTRACT

A protective barrier for protecting a pipe extending through an opening in a framing member.

12 Claims, 11 Drawing Sheets

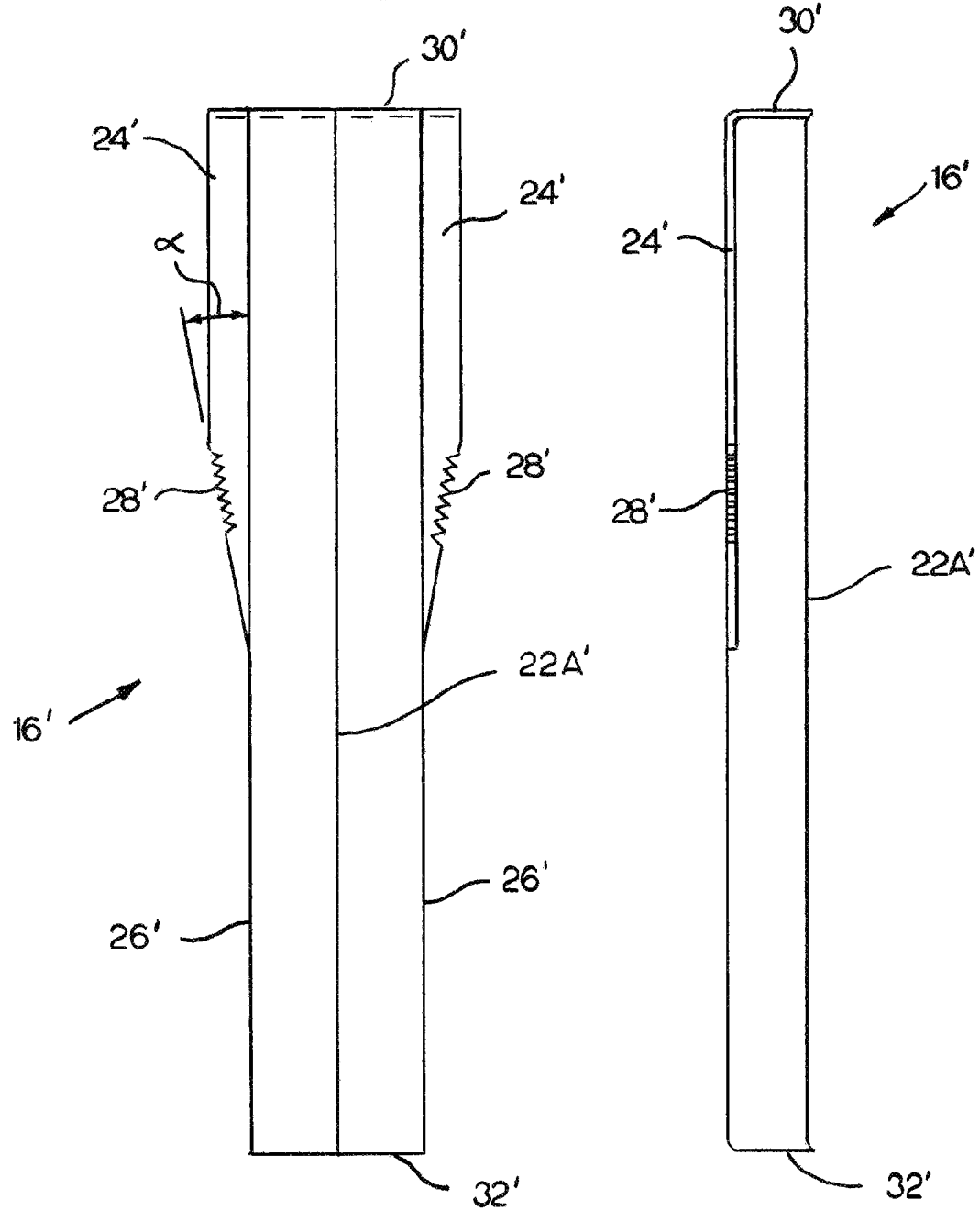

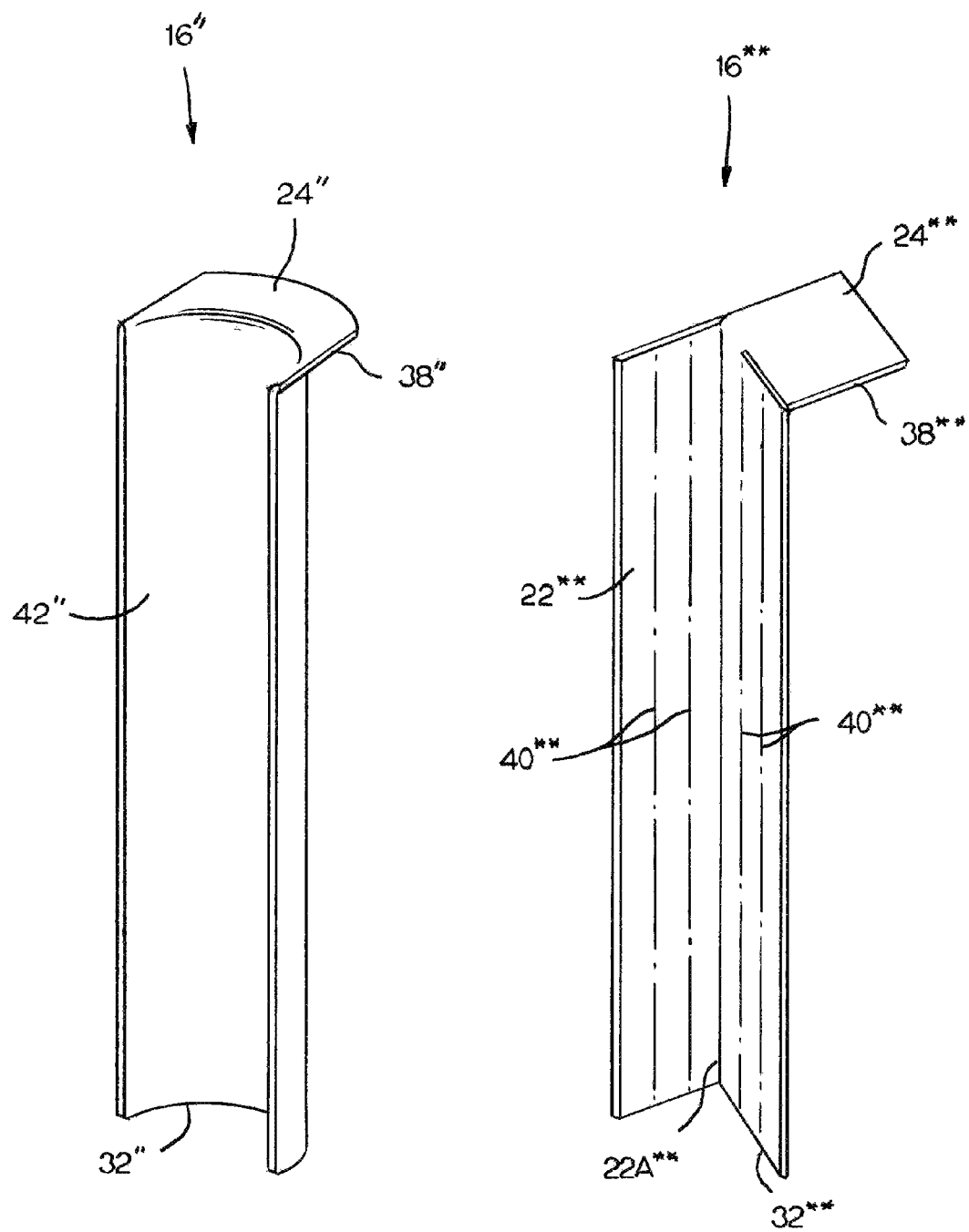

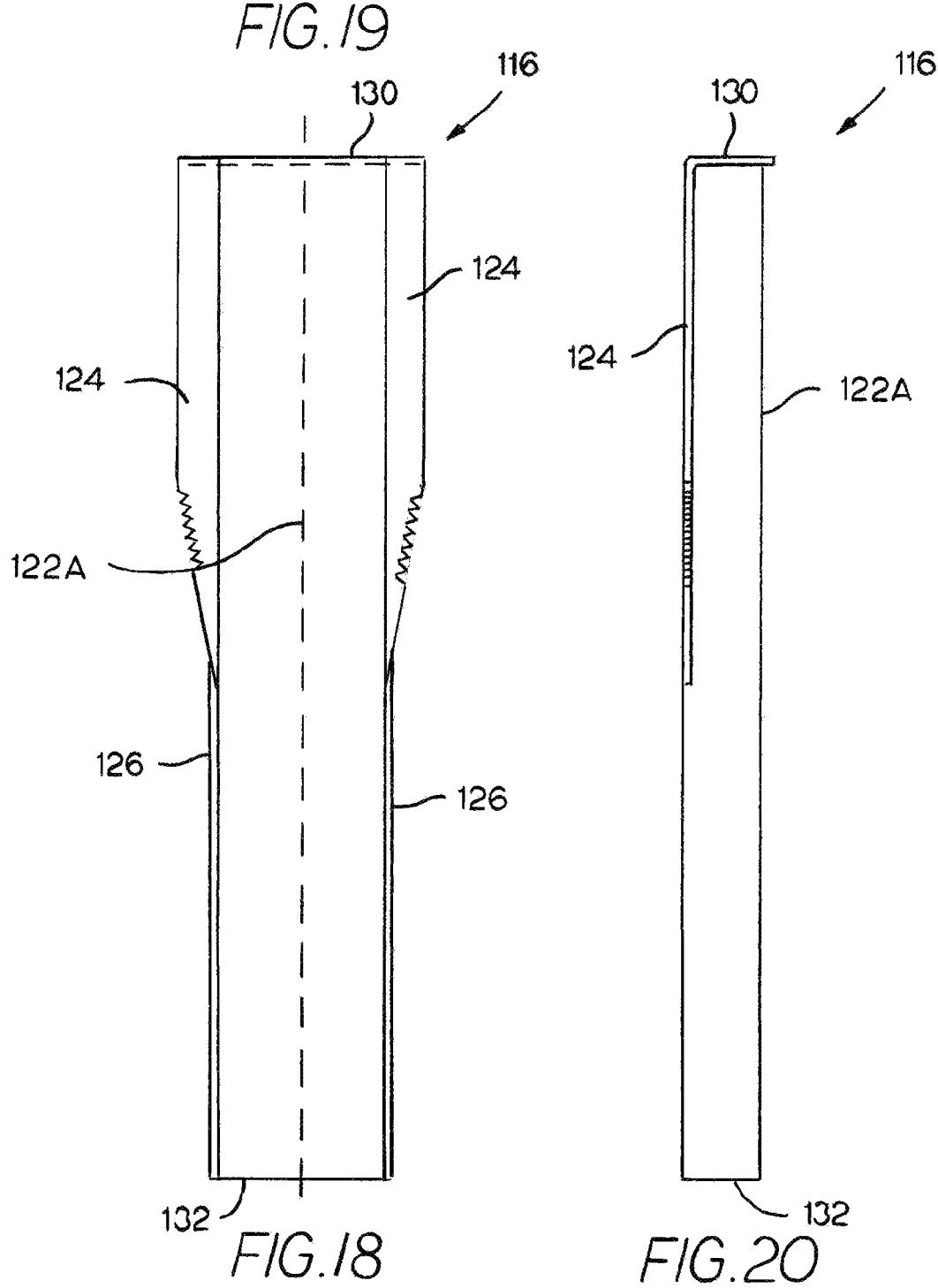

PROTECTIVE BARRIER FOR PIPING AND CABLING

BACKGROUND

This application claims priority from U. S. Provisional Applications Ser. No. 60/767,092 filed Mar. 2, 2006, Ser. No. 60/805,800 filed Jun. 26, 2006, and Ser. No. 60/823,930 filed Aug. 30, 2006, all of which are hereby incorporated herein by reference.

The present invention relates to a protective barrier to protect piping or cabling inside the framing of a construction from being perforated by fasteners, such as nails and screws.

In the rough-in stage of plumbing installations, pipes and cables are extended through framing members of the structure into which they are being installed. The pipes and cables are vulnerable to penetration by fasteners which commonly are driven into the framing members to install subsequent construction items, such as drywall, finish trim, and other attachments to the framing. For the purposes of this description, when the term pipe or piping is used to refer to something that is protected by the invention, it is also understood to include conduit, cables or other pipe-like structures that could be protected by the invention.

SUMMARY

The examples shown here include an elongated body that provides a protective barrier for the pipe. The elongated body may be secured to the pipe itself, as by a peel and stick adhesive, or it may be held in place by other means.

The length of the elongated body is sufficient to cover the portion of pipe to be protected.

BRIEF DESCRIPTION OF THE DRAWINGS

FIG. 5 is a front view of another embodiment of a protective barrier made in accordance with the present invention;

FIG. 6 is a plan view of the barrier of FIG. 5;

FIG. 7 is a side view of the barrier of FIG. 5;

FIG. 14 is a perspective view of another embodiment of a protective barrier made in accordance with the present invention;

FIG. 15 is a perspective view of another embodiment of a protective barrier made in accordance with the present invention;

FIG. 18 is a front view of another embodiment of a protective barrier made in accordance with the present invention;

FIG. 19 is a plan view of the embodiment of FIG. 18;

FIG. 20 is a side view of the embodiment of FIG. 18;

DESCRIPTION

Figure 1:
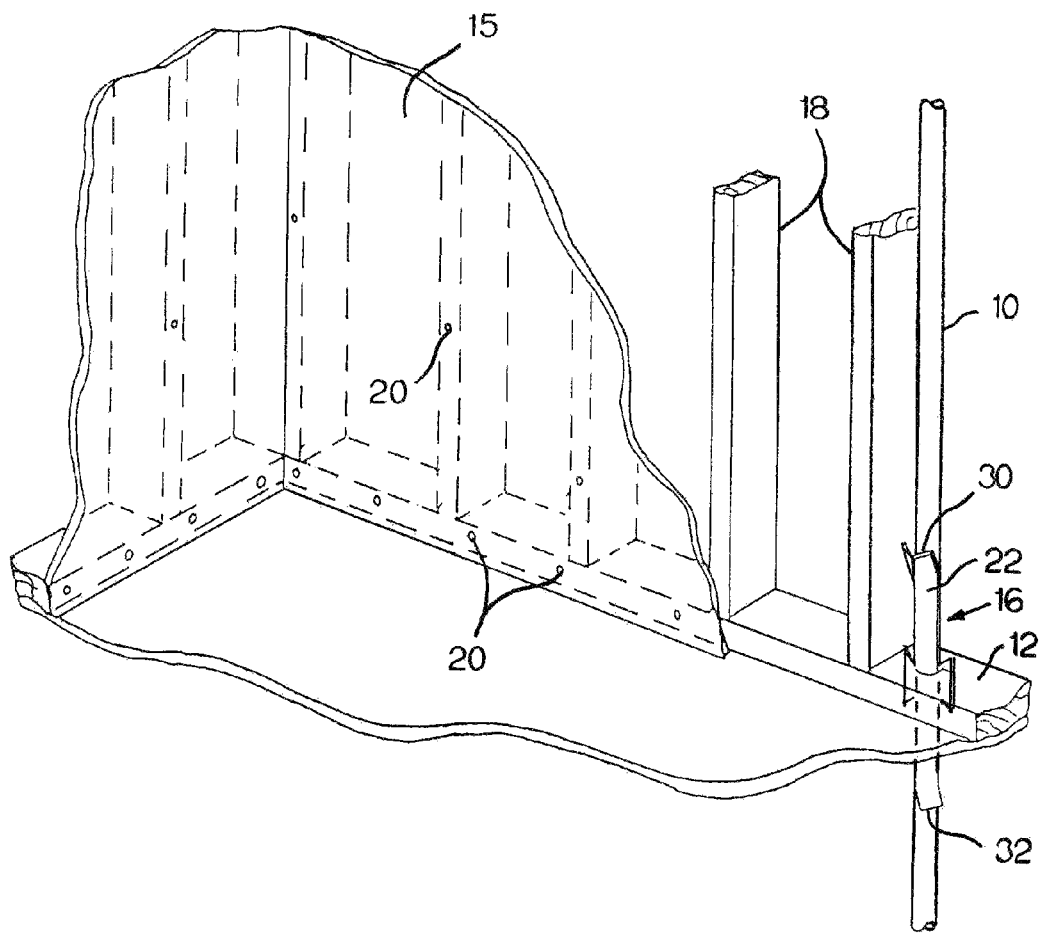
FIG. 1 is a partially broken away, perspective view of a framing structure including a pipe and a protective barrier made in accordance with the present invention.

Referring to FIGS. 1-4, a pipe 10 (which may be a water pipe, electrical conduit, electrical cable, or some other similar construction element) passes through a sole plate 12 via a through-opening 14 in the sole plate 12. Studs 18 project upwardly from the sole plate 12. Items such as drywall 15 or flooring (not shown) may be secured to the sole plate 12 or to the studs 18 via fasteners 20 such as nails or drywall screws, which easily can pierce the pipe 10 if the fastener 20 happens to be aligned with the pipe 10.

To prevent the piercing of the pipe 10 by a fastener 20, a protective barrier 16 may be installed outside the pipe 10 in the area where it passes through the sole plate 12. It should be noted that, while these figures show the pipe 10 and protective barrier 16 extending vertically through the sole plate 12, they may just as well extend horizontally through a stud 18 in the same manner.

The protective barrier 16 preferably is made from a harder and/or thicker material than the pipe 10, which helps stop fasteners 20 from passing through the barrier 16 to the pipe 10. For example, while the pipe 10 typically is made of copper, plastic, or other relatively soft material, the barrier 16 typically is made from hardened steel spring steel, or a penetration resistant polymer material such as Kevlar or ballistic plastic.

Figure 4:
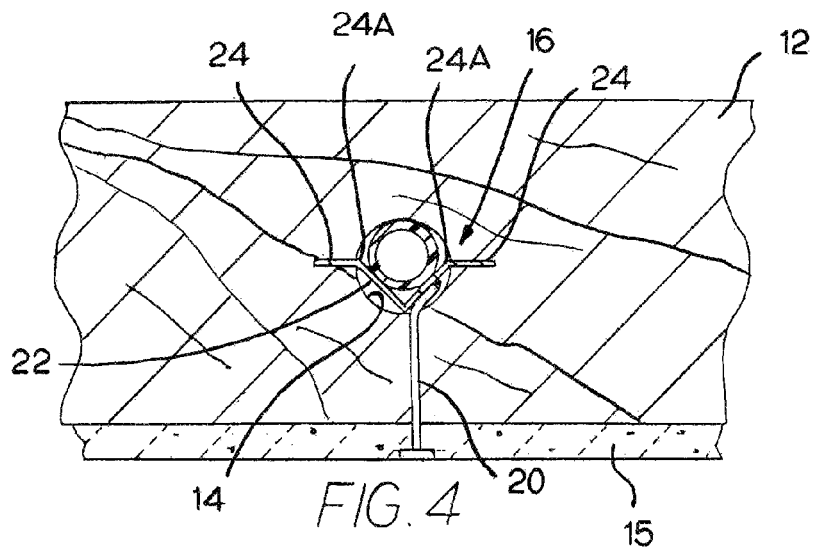
FIG. 4 is a section view along line 4-4 of FIG. 3, but showing the nail after it has been driven into the framing member and deflected by the barrier.

In addition, the protective barrier 16 has a convex external shape. In this particular embodiment, the barrier 16 has a "V" shaped profile. This convex profile means that the tip of the impinging fastener 20 typically hits the barrier 16 at an acute angle which tends to deflect the tip of the impinging fastener 20 outwardly, away from the pipe 10, thereby further protecting the pipe 10, as shown in FIG. 4.

Of course there is always an orientation of the fastener 20 in which it will approach the protective barrier 16 head on (at 90 degrees), but the likelihood of a fastener 20 approaching the barrier directly at ninety degrees is very small. Even in that event, the barrier 16 still provides protection to the pipe 10.

Figures 8, 9, 10:
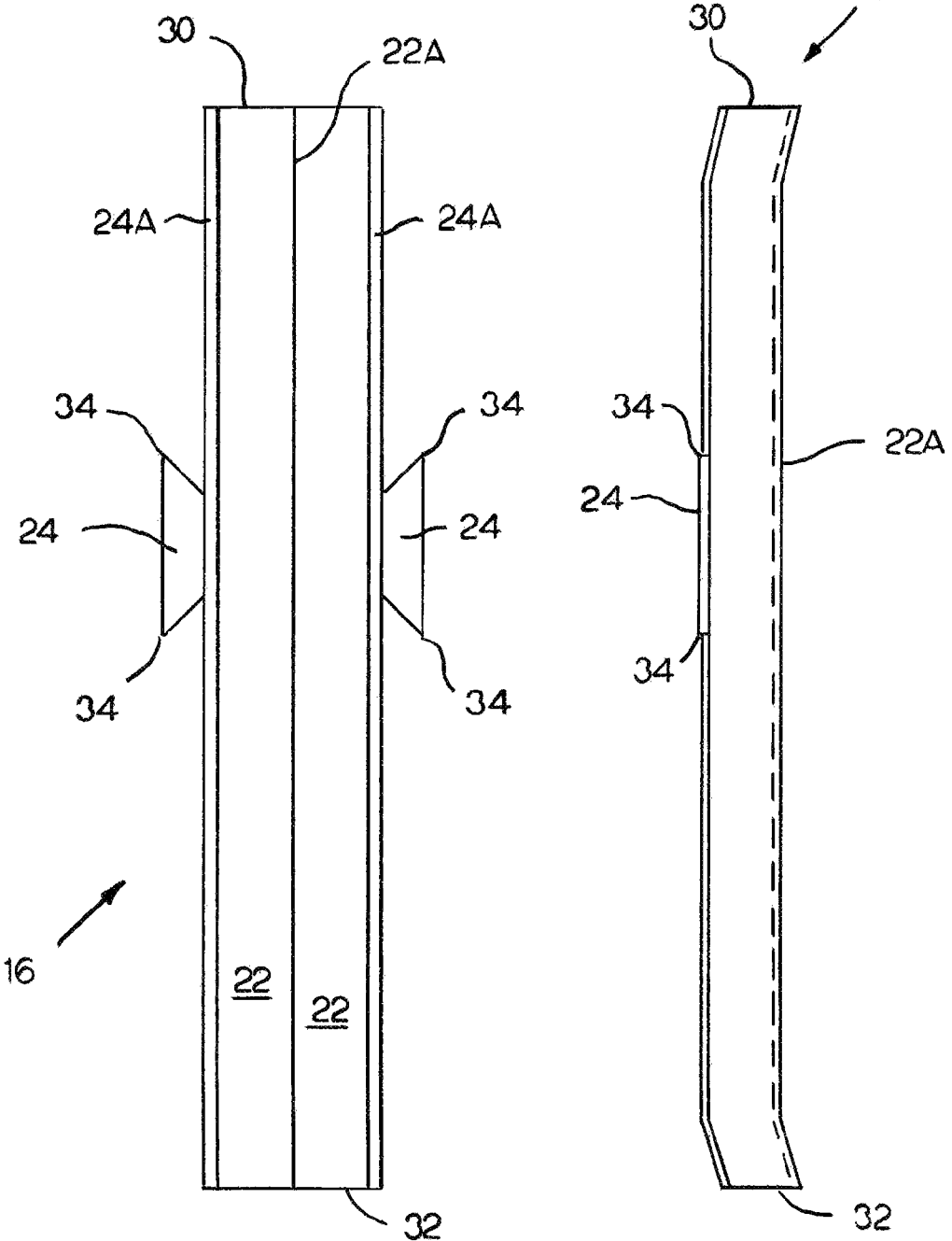
FIG. 8 is a front view of the protective barrier of FIG. 1.
FIG. 9 is a plan view of the barrier of FIG. 8.
FIG. 10 is a side view of the barrier of FIG. 8.

Referring to FIGS. 8-10, which show the barrier 16 in more detail the protective barrier 16 is an elongated member having a first end 30 and a second end 32. It has a generally V-shaped cross-section, made up of left and right legs 22, which meet at an apex 22A, which defines the longitudinal axis of the barrier 16. (It is preferred, but not required, that the barrier 16 be syrmmetrical about the axis 22A.) Left and right sides 24A of the left and right legs 22 extend parallel to the longitudinal axis 22A. Projections (or flanges) 24 extend leftwardly and rightwardly from the left and right sides 24A of the left and right legs 22, respectively. These projections 24 are recessed from the ends 30, 32 of the barrier 16. The projections 24 have a trapezoidal shape and have upper and lower pointed ends 34. which facilitate their entry into a piece of wood. Referring back to FIGS. 2 and 3, the barrier 16 is being inserted downwardly through an opening 14 in a 2×4 wood sole plate 12, and the lower pointed ends 34 will be pressed down into the top surface of the wood 12, anchoring the barrier 16 in place on the sole plate 12. The barrier 16 now projects both upwardly and downwardly beyond the sole plate 12, protecting the pipe 10 not only at the sole plate 12 but also above and below the sole plate 12. Therefore, these pointed ends 34 serve not only as means to secure the barrier 16 to the wood sole plate 12 at a location outside the hole 14: they also serve as "stops" to properly locate the barrier 16 lengthwise relative to the sole plate 12.

This barrier 16 may also have a peel and stick adhesive 36 (See FIG. 9) along its inside surface (the concave walls 22 facing the pipe 10), so it can be adhered to the pipe 10 and can be inserted downwardly into the opening 14 along with the pipe 10, if desired. This peel and stick adhesive may be incorporated into any of the embodiments described herein. if desired, and any adhesive that is used is preferably dielectric in nature to prevent galvanic corrosion of metal pipes. The barrier also may be coated, if desired.

If it is desired to secure the protective barrier 16 to the pipe 10, other alternative means could be used instead of the peel and stick adhesive. For instance, the protective barrier 16 could be clamped to the pipe 10, or it could be welded to the pipe 10, or it could simply fit snugly around the pipe 10 without the need for an adhesive. It is not necessary to secure the protective barrier 16 to the pipe 10, and other means for fixing the protective barrier 16 are described in more detail below.

Figure 2:
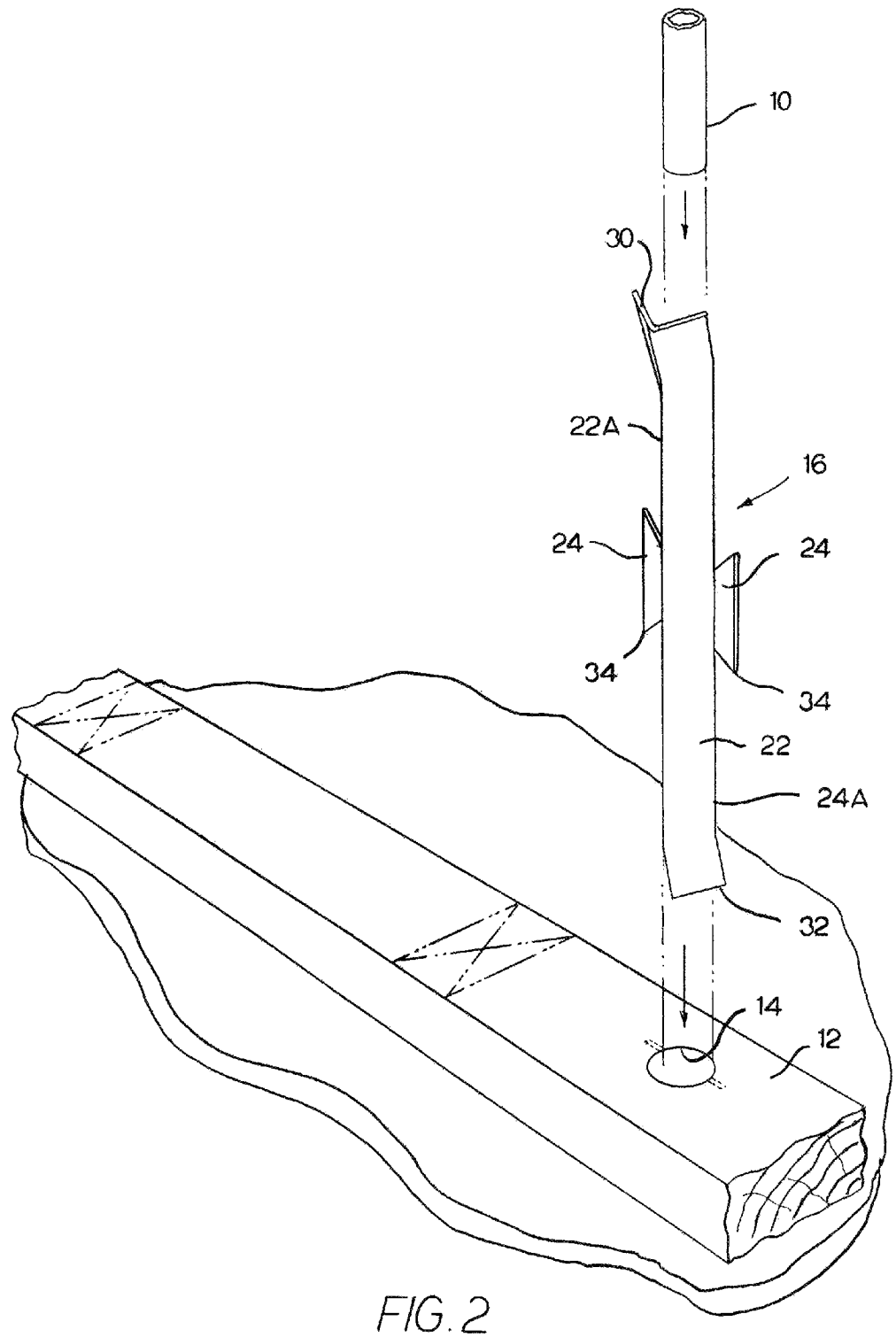
FIG. 2 is an exploded perspective view of the framing structure, pipe and barrier of FIG. 1.

As best appreciated in FIG. 2, both ends 30, 32 of the barrier 16 are bent or recessed outwardly, away from the pipe 10, so that any burrs that may be left from the manufacturing of the barrier 16 will not scratch or cut into the pipe 10. (The extent of the bend may be much less than is shown here.) This feature may be incorporated into any of the embodiments described herein.

Figure 3:
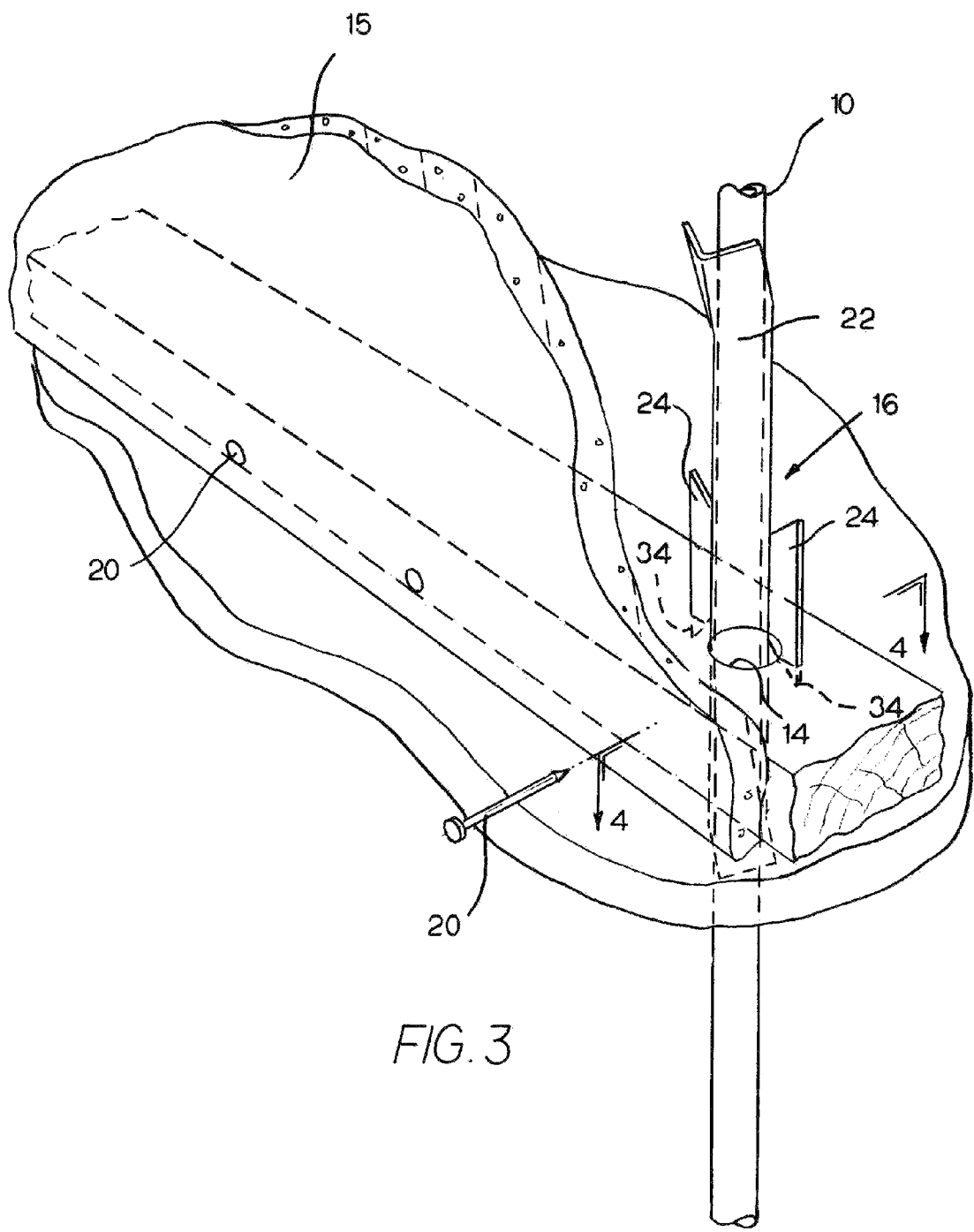
FIG. 3 is an enlarged view of a portion of FIG. 1, just prior to a nail being driven into the framing member at the location of the pipe and barrier.

As shown in FIGS. 2-4, when this barrier 16 is used, the installer preferably drills a hole 14 through the stud or sole plate 12 that has a smaller diameter than the full width of the projections (or flanges) 24 of the barrier 16. The installer may then insert the pipe 10 through the stud or sole plate 12. Either before or after inserting the pipe 10, the installer slides the second end 32 of the barrier 16 through the hole 14 and pushes the barrier 16 through the stud or sole plate 12 until the pointed ends 34 of the projections 24 contact the stud or sole plate 12. Then, the installer takes a hammer and taps the first end 30 of the barrier 16, driving the lower pointed ends 34 of the projections 24 into the surface of the stud or sole plate 12 surrounding the hole 14, thereby securing the barrier 16 to the stud or sole plate 12. If desired, two of the barriers 16 (or any of the protective barrier embodiments described herein) may be installed. one on the front and one on the back of the pipe 10, with both barriers 16 being driven into the stud or sole plate 12 at the hole 14. (See FIG. 21.) It should be noted that, in this embodiment, the barrier 16 extends well beyond the stud or sole plate 12 in both longitudinal directions of the barrier 16. thus protecting the pipe 10 well beyond the stud or sole plate 12.

FIGS. 5-7 depict a second embodiment of a protective barrier 16' made in accordance with the present invention. As was the case for the first embodiment 16, this second embodiment 16' includes an elongated member defining a first end 30' and a second end 32' and has a generally V-shaped cross-section with an apex 22A' and sides 26' that extend parallel to the apex 22A'. This protective barrier 16' has tapered flanges 24' toward its first end 30'. The flanges 24' initially extend at a slight angle a (See FIG. 5) from the initial straight side 26' of the barrier 16' and then extend parallel to the straight side 26'. The angle c preferably is less than 45 degrees, and more preferably less than 30 degrees. The angled portion of the flanges 24' also includes teeth or serrations 28'.

The installation of the barrier 16' is very similar to the installation of the barrier 16 described above. Once the hole 14 has been drilled. the installer may insert the pipe 10 through the stud or sole plate 12. Either before or after inserting the pipe 10, the installer slides the second end 32' of the barrier 16' through the hole 14 and pushes the barrier 16' through the stud or sole plate 12 until the tapered flanges 24' contact the stud or sole plate 12. Then, the installer takes a hammer and taps the first end 30' of the barrier 16', wedging the serrations 28' of the flanges 24' into the wood 12 surrounding the hole 14, and thereby securing the barrier 16' to the stud or sole plate 12.

The serrations 28 engage the inner surface of the hole 14, and, because the flanges 24' lie along a straight line 25' and are opposed to each other, their tapered edges form a wedge. which presses both flanges 24' evenly against the inner surface of the hole 14. without having to press against any other body. such as the pipe or another member inside the hole in order to be secured against the stud or sole plate 12. Thus, as with the previous embodiment, the means for securing this barrier 16' does not require exerting any forces against the pipe 10.

Figure 12:
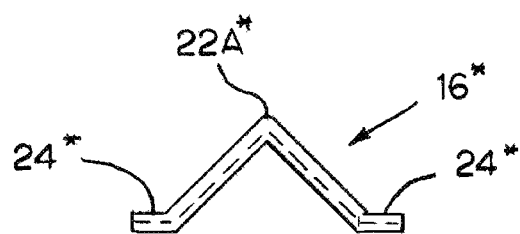
FIG. 12 is a plan view of the barrier of FIG. 11.
Figure 11:
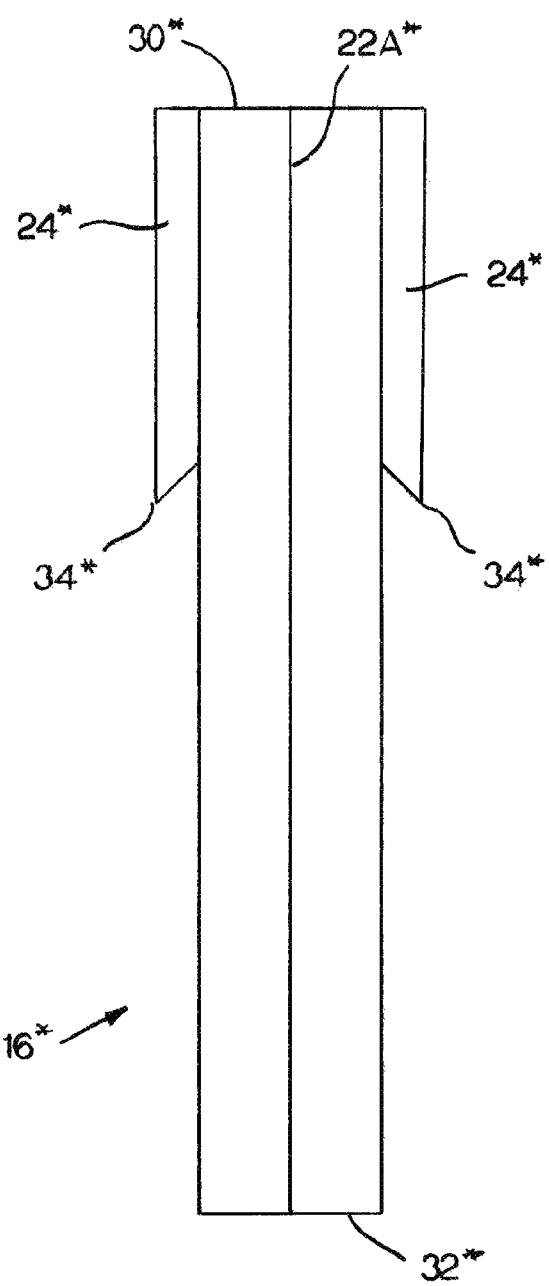
FIG. 11 is a front view of another embodiment of a protective barrier made in accordance with the present invention.
Figure 13:
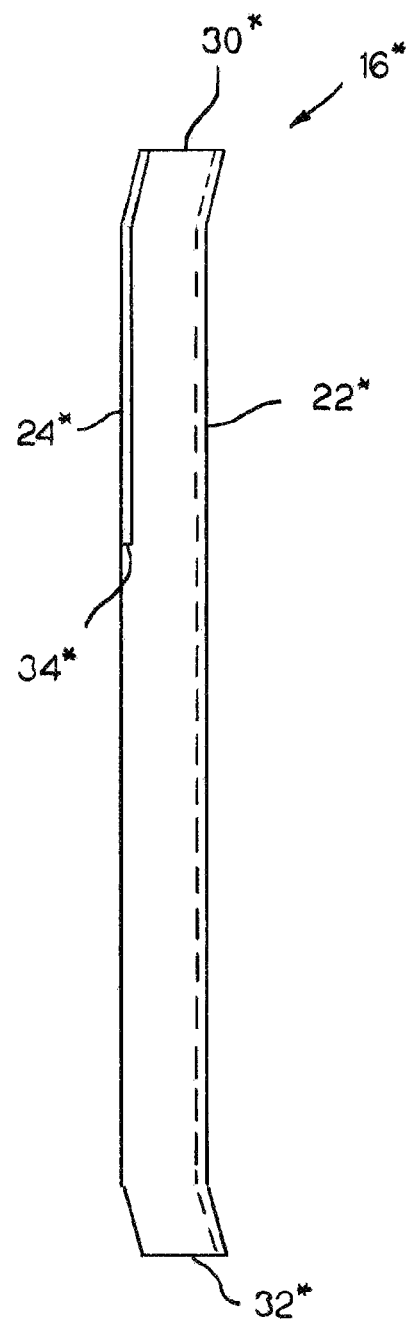
FIG. 13 is a side view of the barrier of FIG. 11.

FIGS. 11-13 depict a third embodiment of a protective barrier 16* made in accordance with the present invention. As was the case for the first embodiment 16 this embodiment 16* has an elongated member defining a first end 30* and a second end 32* and has a generally V-shaped cross-section with an apex 22A* defining an elongated axis. This protective barrier 16* has projections 24*, similar to the projections 24 of the first embodiment 16, except that these projections 24* are adjacent the first end 30*. These projections 24* are not trapezoidal in shape, just quadrilaterals, each quadrilateral defining a single sharp point 34* which may be embedded into the sole plate 12 to secure the barrier 16* to the sole plate 12 in a manner similar to that which has already been described for the first embodiment 16.

FIG. 15 depicts another embodiment of a pipe barrier 16 made in accordance with the present invention. As was the case for the first embodiment 16, this embodiment 16 has an elongated member defining a first end 30 and a second end 32 and it also has a generally V-shaped cross-section with an apex 22A. This protective barrier 16 has a lip 24** adjacent the first end 30*. This lip 24 may be set to rest against the top of the sole plate 12 to prevent the barrier 16 from slipping through the opening 14 in the sole plate 12. A peel off and stick adhesive may also be placed on the "under-surface" 38 of the lip 24 to secure the barrier 16 to the sole plate 12, or some other method for securing the barrier 16 to the sole plate 12 may be used, such as driving a nail or a screw (not shown) through the lip 24 and into the sole plate 12. If the pipe 10 is secured to the protective barrier 16 (via a peel and stick adhesive, for instance), the pipe 10 is then also prevented from slipping through the sole plate 12, and this feature could be used to help position the pipe 10 within the framing.

One advantage of the generally V-shaped cross-section profiled barriers described above is that relatively few sizes of the protective barrier could be used to accommodate a large number of pipe sizes, with the pipes abutting the barrier at different points, depending upon the pipe diameter, with a smaller diameter pipe abutting the barrier closer to the apex of the barrier and a larger diameter pipe abutting the barrier farther away from the apex. If desired, the side walls **22\*\* (See FIG. 15) may be scored longitudinally along the score lines or score marks 40\*\* so the installer can easily break away any portion(s) of the side walls 22\*\*** that he does not need in order to reduce the cross-section profile of the protective barrier (typically when protecting smaller diameter pipe). (If the barrier is secured only to the sole plate and not to the pipe, it is not even necessary for the barrier to touch the pipe.)

FIG. 14 shows another embodiment of a protective barrier 16" made in accordance with the present invention. In this instance, the protective barrier 16" has an arcuate profile (in this instance it is specifically a semi-cylindrical profile) instead of a "V"-shaped profile. It also may include a lip 24". A peel and stick adhesive may also be placed on the "undersurface" 38" of the lip 24" to secure the barrier 16" to the sole plate 12, or some other method for securing the barrier 16" to the sole plate 12 may be used, such as driving a nail or a screw (not shown) through the lip 24" and into the sole plate 12.

If the lip 24" is not present. it may be advantageous to make the barrier 16" of spring steel, as this could allow one size of protective barrier 16" to be used to protect several sizes of pipe by allowing the protective barrier 16" to open up or stretch out to semi-surround the pipe 10 at the proper location. If the barrier 16" is made of a rigid material, it should have an opening large enough to receive the pipe 10 without requiring it to flex, i.e. an opening that is at least as large as the diameter of the pipe to be protected. The inside (or concave) wall 42" of the barrier 16" may include an adhesive (such as a peel and stick adhesive strip) to aid in securing the barrier 16" to the pipe 10.

Figure 16:
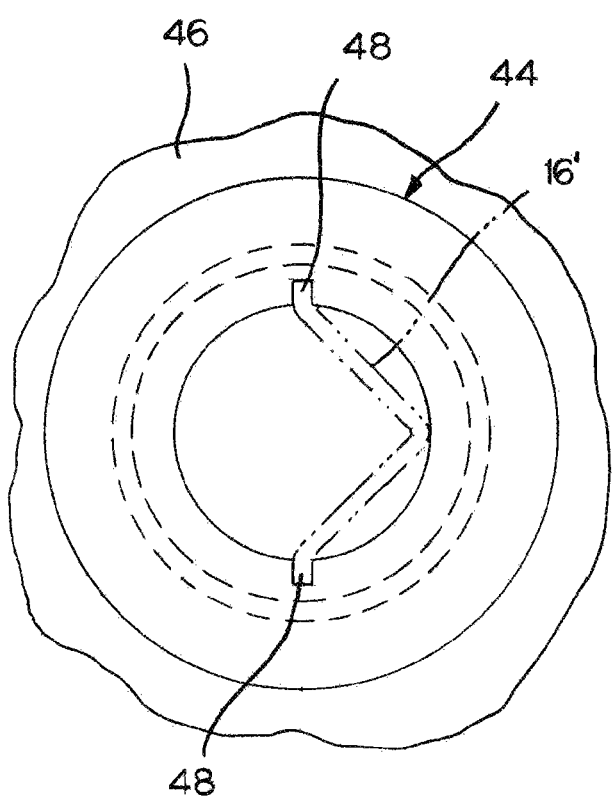
FIG. 16 is a broken away plan view of a grommet for use with some of the embodiments of barriers shown here (with one such barrier shown in phantom), when the barrier is used in steel framing.
Figure 17:
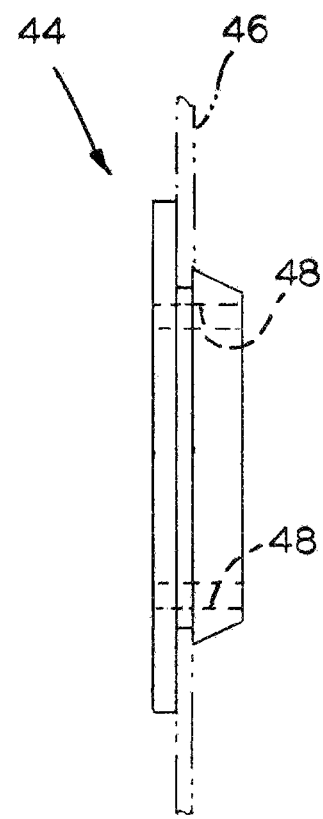
FIG. 17 is a broken away, side view of the grommet of FIG. 16.

FIGS. 16 and 17 show a plastic grommet 44 being used to install the barrier 16' (of FIGS. 5-7 as shown in phantom) into steel studs 46. The grommet 44 has a pair of opposed slots 48 for receiving the flanges 24' of the barrier 16' (or the flanges 24 of the barrier 16, for instance). In this embodiment, the slots 48 lie along a diameter of the grommet 44, but they could alternatively lie along a cord. In order to use the barrier 16' in a steel stud 46. the grommet 44 is inserted through a hole in the steel stud 46, and then the second end 32 of the barrier 16' is inserted through the grommet 44, and the flanges 24' are aligned with the pair of opposed slots 48. The barrier 16' is then tapped with a hammer on its first end 30' until the serrations 28' on the tapered portion of the flanges 24' dig into the grommet 44, thereby retaining the barrier 16' on the stud 46. If desired, a second barrier 16' may be installed, in order to protect the other side of the pipe, with the flanges 24' of the second barrier 16' digging into the same pair of opposed slots 48 in the grommet 44.

FIGS. 18-20 show another alternative embodiment of a barrier 116, which is very similar to the embodiment of FIGS. 5-7, except that it has an arcuate cross-sectional shape. It has a first end 130, a second end 132, an elongated axis 122A. left and right sides 126, and left and right flanges 124 extending leftwardly and rightwardly from the left and right sides 126, respectively. This embodiment would be installed in the same manner as the embodiment of FIGS. 5-7.

Figure 21:
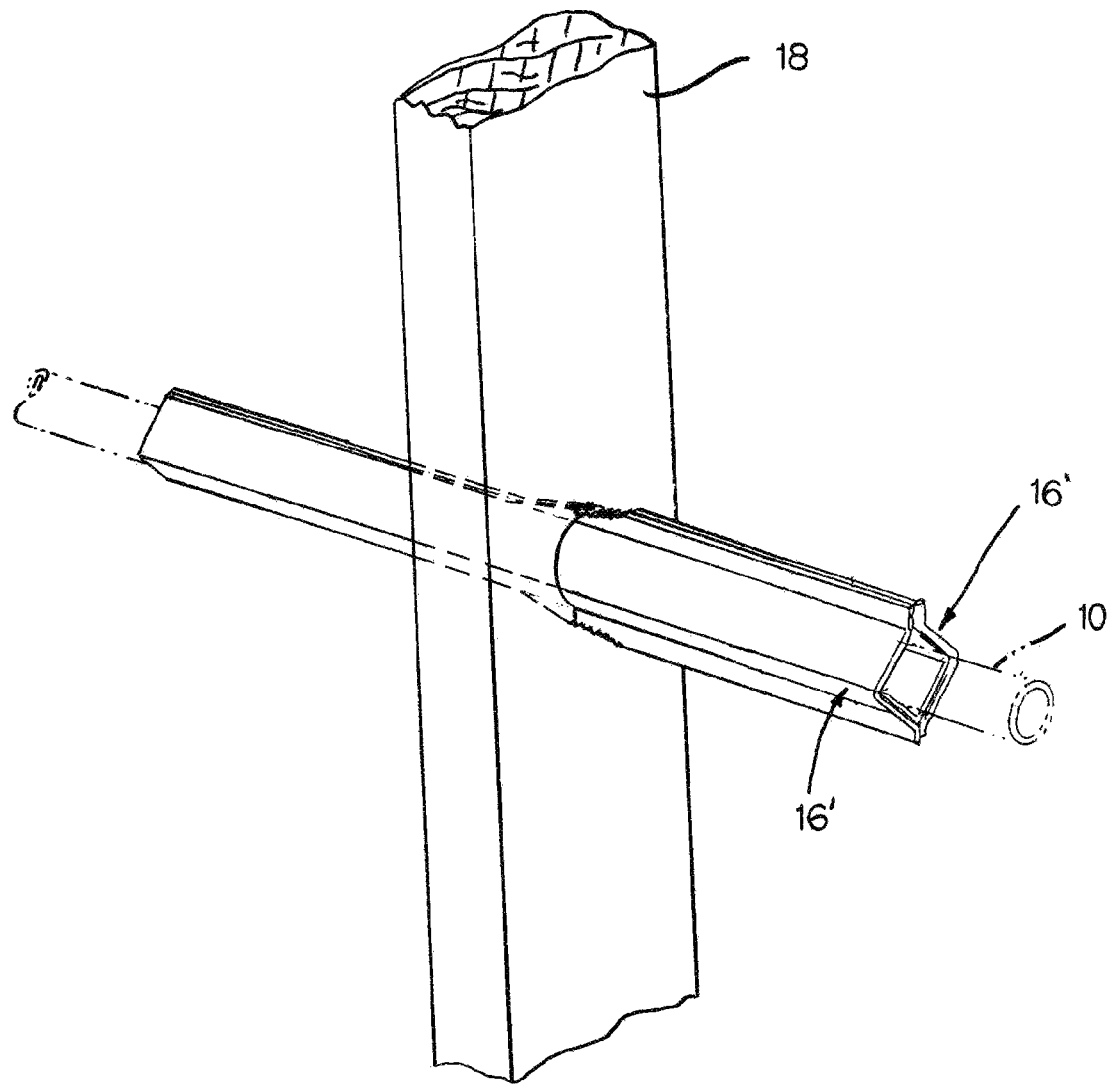
FIG. 21 is a broken-away perspective view of two protective barriers of FIG. 5 protecting the front and back sides of a pipe that is extending through a stud.

FIG. 21 shows two of the barriers 16' of FIGS. 5-7 being installed in a single hole through a stud 18 in order to protect both the front and back of the pipe.

Figure 22:
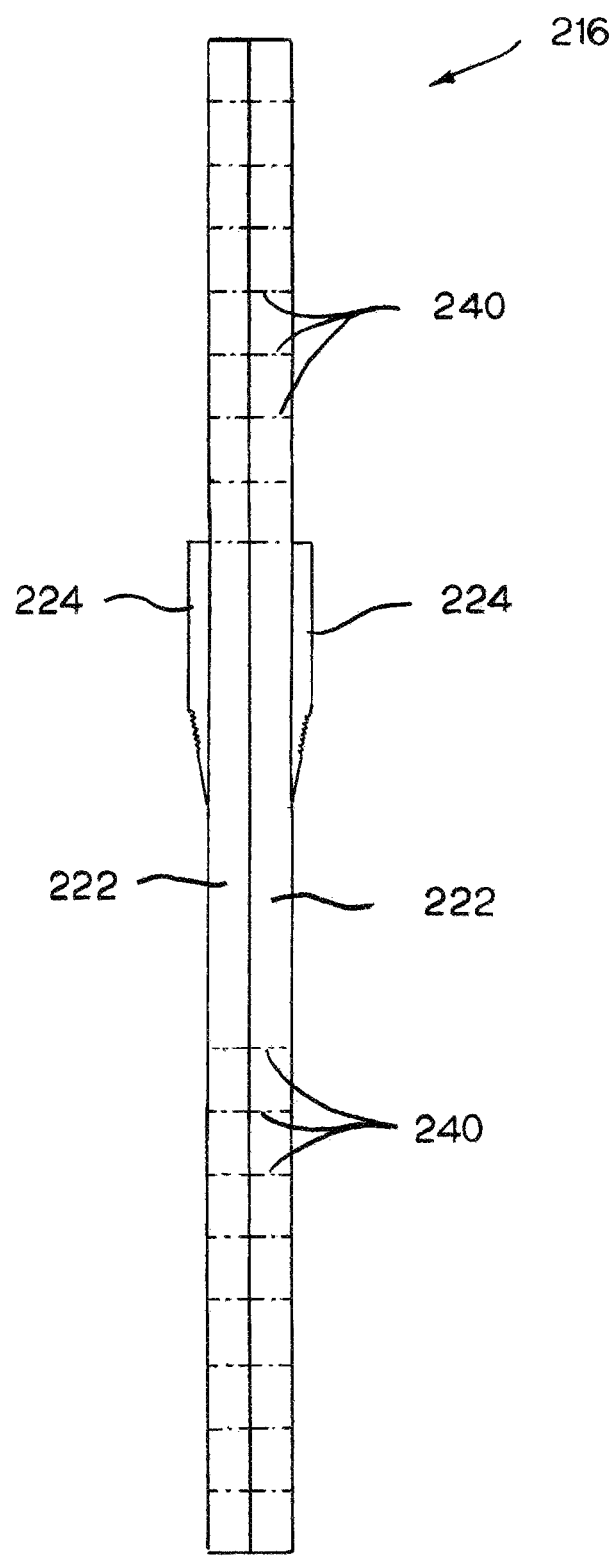
FIG. 22 is a front view of another embodiment of a protective barrier made in accordance with the present invention.

FIG. 22 shows another embodiment of a pipe barrier 216 which is very similar to the embodiment of FIGS. 5-7. except that the left and right sides 222 extend a substantial distance above and below the flanges 224. This pipe barrier 216 may be used. for instance, when it is desirable to protect a pipe substantially the entire distance between two adjacent studs framed on standard 16 inch centers. The additional lengths of the sides 222 may be scored width-wise along the score lines or score marks 240, so the installer can easily break away any portion(s) that he does not need so as to shorten the pipe barrier 216.

It will be obvious to those skilled in the art that modifications may be made to the embodiments described above without departing from the scope of the present invention.

What is claimed is:

1. A protective barrier for protecting a pipe passing through an opening in a framing member, comprising: an elongated channel having a cross-sectional profile defining an outer, generally-convex surface and an inner, generally-concave surface; said elongated channel having a first distal end and a second distal end; an elongated axis extending from said first distal end to said second distal end; a left side and a right side to the left and right of said elongated axis, respectively; and a left flange and a right flange projecting leftwardly and rightwardly from said left side and said right side, respectively, each one of said left flange and said right flange longitudinally extending from proximate said first distal end and tapering into said outer, convex surface at a distance longitudinally offset from said second distal end of said elongated channel; each one of said left flange and said right flange defines a tapered edge extending at an acute angle from its corresponding side; and each one of said tapered edges having serrations engaging said opening in said framing member so that said elongated channel is positioned through said opening and extends beyond said opening of said framing member in both longitudinal directions so as to protect the pipe beyond said framing member in both longitudinal directions.

2. A protective barrier for protecting a pipe passing through an opening in a framing member as recited in claim 1, wherein said acute angle is less than 45 degrees.

3. A protective barrier for protecting a pipe passing through an opening in a framing member as recited in claim 1, wherein said elongated channel proximate said second distal end is narrower in diameter than said opening of said framing member.

4. A protective barrier for protecting a pipe passing through an opening in a framing member as recited in claim 1, and further including an adhesive on said inner, concave surface.

5. A protective barrier for protecting a pipe passing through an opening in a framing member as recited in claim 1, wherein said cross-sectional profile is "V"-shaped.

6. A protective barrier for protecting a pipe passing through an opening in a framing member as recited in claim 1, wherein said cross-sectional profile is arcuate.

7. A protective barrier for protecting a pipe passing through an opening in a framing member, comprising: an elongated channel having a cross-sectional profile with an outer, generally-convex surface and an inner, generally-concave surface; said elongated channel having a first distal end and a second distal end; a longitudinal axis extending from said first distal end to said second distal end; and one or more flanges projecting from said outer, convex surface and longitudinally extending a portion of the length of said elongated channel and tapering into said outer, convex surface towards said second distal end; each of said one or more flanges is longitudinally offset from said second distal end; said elongated channel extending through said opening in said framing member without imparting compressive forces against the pipe, wherein said elongated channel longitudinally extends beyond said opening of said framing member in both longitudinal directions so as to enable it to protect the pipe beyond the said framing member in both longitudinal directions; and wherein each of said one or more flanges includes a tapered edge extending at an acute angle from said outer, convex surface, wherein each said tapered edge engages an inner surface of said opening of said framing member.

8. A protective barrier for protecting a pipe passing through an opening in a framing member as recited in claim 7, and further including a grommet defining an opening sized to receive said elongated channel and wherein said grommet opening defining two substantially opposed slots which are sized and located to receive said one or more flanges.

9. A protective barrier for protecting a pipe passing through an opening in a framing member as recited in claim 7, wherein the distance between two of said one or more flanges is larger in width than said opening of said framing member.

10. A protective barrier for protecting a pipe passing through an opening in a framing member as recited in claim 9, and further including an adhesive on said inner, concave surface.

11. A protective barrier for protecting a pipe passing through an opening in a framing member as recited in claim 9, wherein said cross-sectional profile is "V"-shaped.

12. A protective barrier for protecting a pipe passing through an opening in a framing member as recited in claim 9, wherein said cross-sectional profile is arcuate.

* * * * *